E. BENNER.
IRRIGATING VALVE.
APPLICATION FILED MAR. 4, 1918.
1,287,189.
Patented Dec. 10, 1918.
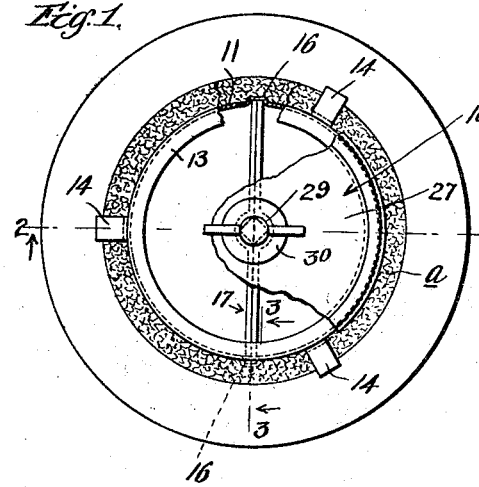
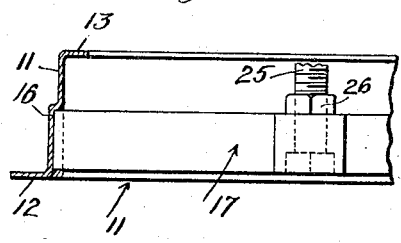
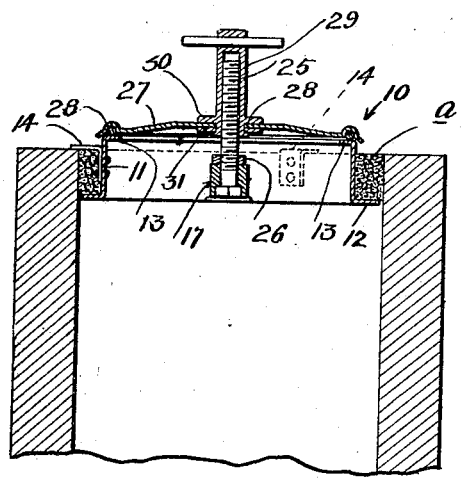
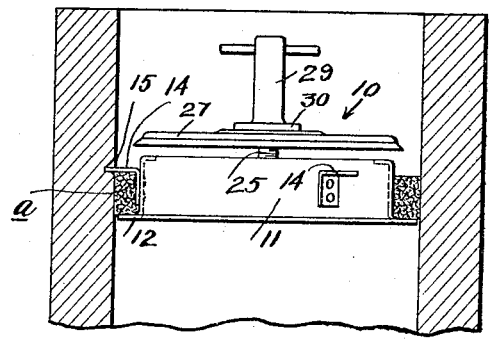
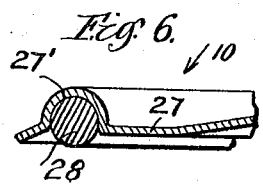
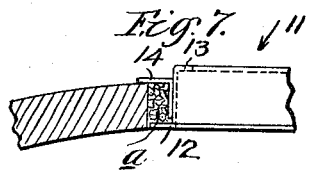
INVENTOR
Edward Benner
BY
ATTORNEY

UNITED STATES PATENT OFFICE.

EDWARD BENNER, OF LOS ANGELES, CALIFORNIA.

IRRIGATING-VALVE.

1,287,189.

Specification of Letters Patent. Patented Dec. 10, 1918.

Application filed March 4, 1918. Serial No. 220,113.

*To all whom it may concern:*

Be it known that I, EDWARD BENNER, a citizen of the United States, residing at Los Angeles, in the county of Los Angeles and State of California, have invented new and useful Improvements in Irrigating-Valves, of which the following is a specification.

My invention relates more specifically to improvements in irrigating valves of the type usually employed in connection with stand-pipes, or horizontally disposed pipe lines to which the same are connected, and pertains more particularly to a novel means for conveniently attaching the same to stand-pipes or lines.

An object of my invention is to provide an inexpensive irrigating valve construction that may be readily attached to the upper ends of stand-pipes or mounted within the pipe.

A further object of my invention is to provide a novel form of gasket construction for the movable valve plate or cover.

A still further object of my invention is to provide an irrigating valve construction so formed that the same may be readily stamped from sheet metal, thereby eliminating expensive castings and patterns therefor.

Other and further objects and advantages of the invention will be hereinafter set forth and the novel features thereof specifically defined in the appended claims, an embodiment of my invention being illustrated in the accompanying drawing forming a part thereof, in which:

Figure 1, is a plan view of my improved irrigating valve connected to a stand-pipe of usual construction, parts being broken away for clarity of illustration.

Fig. 2, is a longitudinal section view of the upper portion of stand-pipe showing my irrigating valve in place thereon, said section being taken on line 2—2 of Fig. 1.

Fig. 3, is an enlarged detail section of the lower seat portion of the valve illustrating the operating means for adjusting the threaded valve stem.

Fig. 4, is a detailed plan view illustrating the formation of the valve stem supporting means or anchor for same.

Fig. 5, is a longitudinal section taken through the upper portion of a stand-pipe showing my improved valve construction in place within the pipe.

Fig. 6, is an enlarged detail illustrating the method of securing the gasket to the under face of the valve plate.

Fig. 7, is a detail section through a portion of the valve frame showing the manner of securing the same to an opening in a pipe line.

The valve 10 is adapted for application to a cement stand-pipe or other part of an irrigating pipe line, as clearly shown in Figs. 1, 2 and 3 of the drawing, and consists preferably of an annular frame 11 stamped from sheet metal, the lower portion of said frame having an outwardly extending annular flange 12 and on its upper end an inwardly turned flange or seat 13.

The diameter of frame 12 across its lower end is substantially the internal diameter of the pipe to which it is attached. Secured to the vertical annular wall of frame 12 by rivets or other suitable securing means is a plurality of outwardly extending resilient lugs or arms 14 adapted to maintain the frame 11 in position when the valve is mounted within or on a stand-pipe, as clearly shown in the various views of the drawing. When securing the valve to the upper portion of the stand-pipe, as illustrated in Figs. 1 and 2 of the drawing, the arms 14 extend slightly beyond the internal edge of the pipe and maintain the same in position, the lower annular flange 12 supporting the cement filling A which is inserted between the inner wall of the stand-pipe and the outer peripheral wall of the valve frame.

When it is desired to secure the valve within the pipe, as illustrated in Fig. 5 of the drawing, slight recesses 15 are formed in the inner face of the walls of the stand-pipe at points below the upper end of the pipe where it is desired to place the valve for reception of the spring arms 14, the annular recess formed by the stand-pipe wall and the vertical annular wall of the valve frame, as clearly shown in Fig. 5 of the drawing, the lower annular flange 12 supporting the cement as is the case when the valve is secured to the top of the stand-pipe.

The vertical annular wall of frame 11 is provided with diametrically disposed offsets forming recesses 16 for the reception of the ends of a cross piece or arch 17, the recesses extending from the bottom of flange 12 upwardly and terminating short of the upper annular edge of frame 11. Cross piece 17 is preferably formed of two flat bars of metal 18 and 19, each having at the center thereof an angular recess 20, said recesses forming when the bars 18 and 19 are placed together a socket for the reception of a headed valve stem. These bars when placed together are forced upwardly into the recesses 16 formed in the frame member 11, the lower ends of the recesses being "spot" welded to maintain the bridge or cross piece in rigid relation to the frame.

Mounted in the socket formed in cross piece 17 is an upwardly extending threaded valve stem 25, the lower end of said stem being headed and fitting within the annular socket formed in the cross piece, the vertical walls of the socket preventing a turning movement of the stem. A jam nut 26 mounted on the valve stem holds the stem in a rigid upright relation to the cross piece.

The valve plate or closure 27 preferably consists of a stamped annular member provided on its under face with a concentric groove 27' adjacent its edge. Mounted within groove 27' is a rubber gasket 28 in the form of a ring held in position by frictional contact, the diameter of said gasket being slightly greater than the width of groove 27'. Valve plate 27 is provided at the center thereof with a circular opening 28 through which the lower end of a T-shaped nut 29 passes, nut 29 being provided with an annular shoulder 30 projecting therefrom, the under face of said shoulder bearing against the upper face of the valve plate. Mounted on the end of nut 25 is a washer 31 which is held in place by the end of the nut 29 which is turned over slightly. By means of this construction it will be noted that the valve plate 27 is held in a swiveled relation to the nut 29, the plate rotating with the nut as the same is screwed downwardly until the rubber gasket 28 engages with the flange 13 formed on valve frame 11, the frictional contact of the gasket preventing a further turning movement of the valve plate and thereby lessening the wear on the gasket.

It will be observed from the foregoing that by means of the annular vertical wall of the valve frame and its lower annular flange 12, I am enabled to quickly cement the valve in position on the stand-pipes or in the lines on which said pipes are erected.

It will be noted further that by means of the novel configuration of the valve frame, that it will be a comparatively easy matter to cement a valve in an opening formed in an irrigating pipe line, as clearly shown in Fig. 7 of the drawings.

What I claim is:

1. In a valve construction, a stamped annular valve frame having a vertically disposed wall and an annular flange projecting from the lower end of said wall, a plurality of arms secured to the outer face of the vertical wall of said frame and projecting therefrom at substantially right angles, said valve frame being provided with an opening therethrough and an annular valve seat, a bridge diametrically secured to said frame, a threaded valve stem rigidly secured to said bridge, and a valve plate rotatably mounted on said valve stem.

2. In a valve construction, a stamped annular valve frame having a vertically disposed wall and an annular flange projecting at right angles from the lower end of said wall, a plurality of resilient arms secured to the outer surface of the vertical wall of said frame and projecting at substantially right angles therefrom, said valve frame being provided with an opening therethrough and an annular valve seat formed on the upper end of said vertical wall, a bridge disposed within said frame, a threaded valve stem rigidly secured to said bridge at the center thereof, and a rotatable nut having a stamped valve plate swivelly secured thereto mounted on said valve stem.

3. In a valve construction, a stamped annular valve frame having a vertically disposed wall and an annular flange projecting outwardly therefrom at the bottom thereof, said valve frame having an opening therethrough and an annular valve seat formed on the upper end of said vertical wall by an inwardly projecting flange of the stamped frame, a valve stem supporting member secured within said frame, a threaded valve stem secured to the center of said member and projecting upwardly therefrom, and a valve closure plate having an annular gasket secured to its under face rotatably mounted on said valve stem.

4. In a valve of the class described, a stamped body having a flange projecting outwardly at one end and having another flange projecting inwardly at the other end, the inwardly projecting flange forming the valve seat.

5. In a valve of the class described, a stamped body having a flange projecting outwardly at one end and having another flange projecting inwardly at the other end, and suitable recesses provided in the stamped body extending from the end with the outwardly projecting flange to a point near the end with the inwardly projecting flange providing rests for operating means of the valve, the inwardly projecting flange forming the valve seat.

6. In a valve of the class described, a stamped closure plate having a raised center part for reinforcement gradually rising from the edges toward the highest point near the center and having a suitable recess near the outer edge for a gasket rest.

7. In a valve of the class described, a stamped closure plate having a raised center part gradually rising from the edge toward the highest point near the center for reinforcement and having a suitable recess near the outer edge for a gasket rest, the plate having also an opening through its center, a handle stem turnably mounted in the center opening and having an abutment resting on the closure plate a suitable distance from the lower termination of the stem and projecting through the plate, a washer disposed on the lower end of the handle stem resting against the lower surface of the plate opposite to the abutment on the stem, the free portion of the lower end of the stem projecting through the closure plate and through the washer being bent outwardly over the washer so as to turnably lock the handle stem on the plate.

8. In a valve of the class described, a stamped body having at one end a flange projecting outwardly and having at its opposite end another flange projecting inwardly, the inwardly projecting flange forming the valve seat, the stamped body having recesses extending from the end with the outwardly projecting flange to a point near the opposite end, a bridge disposed in said recesses in the body, a threaded stem mounted on the bridge, a stamped closure plate having a recess near its outer edge, a gasket disposed in the recess of the closure plate, the recess in the closure plate coming in alinement with the inwardly projecting flange of the stamped body, a handle stem turnably mounted in the center of the closure plate, having an abutment resting on the closure plate and having an extension projecting through the closure plate, and a washer disposed on the extension resting against the lower surface of the closure plate opposite to the abutment on the stem, the free portion of the extension being bent outwardly over the washer so as to turnably lock the handle stem in the closure plate, the handle stem being hollow and having a threaded part within its hollow part for engaging with the threaded stem on the bridge.

In witness that I claim the foregoing I have hereunto subscribed my name this 12th day of February, 1918.

EDWARD BENNER.

Copies of this patent may be obtained for five cents each, by addressing the "Commissioner of Patents, Washington, D. C."